United States Patent
Elliot

(10) Patent No.: US 9,495,353 B2
(45) Date of Patent: *Nov. 15, 2016

(54) METHOD AND SYSTEM FOR GENERATING A PARSER AND PARSING COMPLEX DATA

(71) Applicant: PALANTIR TECHNOLOGIES INC., Palo Alto, CA (US)

(72) Inventor: Mark Elliot, Arlington, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/526,066

(22) Filed: Oct. 28, 2014

(65) Prior Publication Data

US 2015/0046481 A1  Feb. 12, 2015

Related U.S. Application Data

(63) Continuation of application No. 14/187,164, filed on Feb. 21, 2014, now Pat. No. 8,903,717, which is a
(Continued)

(51) Int. Cl.
*G06F 17/27* (2006.01)
*G06F 9/45* (2006.01)
*G06F 17/30* (2006.01)

(52) U.S. Cl.
CPC ........... *G06F 17/2705* (2013.01); *G06F 8/427* (2013.01); *G06F 17/30595* (2013.01)

(58) Field of Classification Search
USPC ........................................ 704/9, 10
See application file for complete search history.

(56) References Cited

U.S. PATENT DOCUMENTS

| 5,826,021 A | 10/1998 | Mastors et al. |
| 5,832,218 A | 11/1998 | Gibbs et al. |

(Continued)

FOREIGN PATENT DOCUMENTS

| CA | 2666364 | 1/2015 |
| CN | 102054015 | 5/2014 |

(Continued)

OTHER PUBLICATIONS

"A Real-World Problem of Matching Records," Nov. 2006, <http://grupoweb.upf.es/bd-web/slides/ullman.pdf> pp. 1-16.
(Continued)

*Primary Examiner* — Douglas Godbold
(74) *Attorney, Agent, or Firm* — Finnegan, Henderson, Farabow, Garrett & Dunner LLP

(57) ABSTRACT

Computer-implemented systems and methods are disclosed for constructing a parser that parses complex data. In some embodiments, a method is provided for receiving a parser definition as an input to a parser generator and generating a parser at least in part from the parser definition. In some embodiments, the generated parser comprises two or more handlers forming a processing pipeline. In some embodiments, the parser receives as input a first string into the processing pipeline. In some embodiments, the parser generates a second string by a first handler and inputs the second string regeneratively into the parsing pipeline, if the first string matches an expression specified for the first handler in the parser definition.

15 Claims, 7 Drawing Sheets

Related U.S. Application Data continuation of application No. 14/173,743, filed on Feb. 5, 2014, now Pat. No. 8,855,999.

(60) Provisional application No. 61/801,432, filed on Mar. 15, 2013.

(56) References Cited

U.S. PATENT DOCUMENTS

| | | | |
|---|---|---|---|
| 5,878,434 A | 3/1999 | Draper et al. | |
| 5,897,636 A | 4/1999 | Kaeser | |
| 5,966,706 A | 10/1999 | Biliris et al. | |
| 6,006,242 A | 12/1999 | Poole et al. | |
| 6,057,757 A | 5/2000 | Arrowsmith et al. | |
| 6,134,582 A | 10/2000 | Kennedy | |
| 6,243,717 B1 | 6/2001 | Gordon et al. | |
| 6,289,338 B1 | 9/2001 | Stoffel et al. | |
| 6,430,305 B1 | 8/2002 | Decker | |
| 6,463,404 B1 | 10/2002 | Appleby | |
| 6,519,627 B1 | 2/2003 | Dan et al. | |
| 6,523,019 B1 | 2/2003 | Borthwick | |
| 6,523,172 B1 | 2/2003 | Martines-Guerra et al. | |
| 6,539,538 B1 | 3/2003 | Brewster et al. | |
| 6,640,231 B1 | 10/2003 | Andersen et al. | |
| 6,748,481 B1 | 6/2004 | Parry et al. | |
| 6,877,137 B1 | 4/2005 | Rivette et al. | |
| 7,027,974 B1 | 4/2006 | Busch et al. | |
| 7,058,648 B1 | 6/2006 | Lightfoot et al. | |
| 7,089,541 B2 | 8/2006 | Ungar | |
| 7,237,192 B1 | 6/2007 | Stephenson et al. | |
| 7,240,330 B2 | 7/2007 | Fairweather | |
| 7,403,942 B1 | 7/2008 | Bayliss | |
| 7,461,158 B2 | 12/2008 | Rider et al. | |
| 7,533,069 B2 | 5/2009 | Fairweather | |
| 7,627,489 B2 | 12/2009 | Schaeffer et al. | |
| 7,685,083 B2 | 3/2010 | Fairweather | |
| 7,739,246 B2 | 6/2010 | Mooney et al. | |
| 7,757,220 B2 | 7/2010 | Griffith et al. | |
| 7,877,421 B2 | 1/2011 | Berger et al. | |
| 7,912,842 B1 | 3/2011 | Bayliss | |
| 7,962,495 B2 | 6/2011 | Jain et al. | |
| 8,117,022 B2* | 2/2012 | Linker | G06F 17/28 704/1 |
| 8,126,848 B2 | 2/2012 | Wagner | |
| 8,132,149 B2 | 3/2012 | Shenfield et al. | |
| 8,147,715 B2 | 4/2012 | Hirosaki | |
| 8,271,948 B2 | 9/2012 | Talozi et al. | |
| 8,290,838 B1 | 10/2012 | Thakur et al. | |
| 8,302,855 B2 | 11/2012 | Ma et al. | |
| 8,364,642 B1 | 1/2013 | Garrod | |
| 8,386,377 B1 | 2/2013 | Xiong et al. | |
| 8,429,527 B1 | 4/2013 | Arbogast | |
| 8,489,623 B2 | 7/2013 | Jain et al. | |
| 8,554,719 B2 | 10/2013 | McGrew | |
| 8,560,494 B1 | 10/2013 | Downing et al. | |
| 8,601,326 B1 | 12/2013 | Kim | |
| 8,639,552 B1 | 1/2014 | Chen et al. | |
| 8,688,573 B1 | 4/2014 | Rukonic et al. | |
| 8,689,182 B2 | 4/2014 | Leithead et al. | |
| 8,812,444 B2 | 8/2014 | Garrod et al. | |
| 8,838,538 B1 | 9/2014 | Landau et al. | |
| 8,855,999 B1* | 10/2014 | Elliot | G06F 17/2705 704/1 |
| 8,903,717 B2 | 12/2014 | Elliot | |
| 8,924,388 B2 | 12/2014 | Elliot et al. | |
| 8,924,389 B2 | 12/2014 | Elliot et al. | |
| 8,930,897 B2 | 1/2015 | Nassar | |
| 8,938,434 B2 | 1/2015 | Jain et al. | |
| 8,938,686 B1 | 1/2015 | Erenrich et al. | |
| 9,105,000 B1 | 8/2015 | White et al. | |
| 9,201,920 B2 | 12/2015 | Jain et al. | |
| 9,223,773 B2 | 12/2015 | Isaacson | |
| 9,229,952 B1 | 1/2016 | Meacham et al. | |
| 9,230,060 B2 | 1/2016 | Friedlander et al. | |
| 2002/0035590 A1 | 3/2002 | Eibach et al. | |
| 2002/0095360 A1 | 7/2002 | Joao | |
| 2002/0103705 A1 | 8/2002 | Brady | |
| 2002/0194058 A1 | 12/2002 | Eldering | |
| 2003/0074187 A1* | 4/2003 | Ait-Mokhtar | G06F 17/271 704/9 |
| 2003/0088438 A1 | 5/2003 | Maughan et al. | |
| 2003/0093401 A1 | 5/2003 | Czahowski et al. | |
| 2003/0105759 A1 | 6/2003 | Bess et al. | |
| 2003/0115481 A1 | 6/2003 | Baird et al. | |
| 2003/0126102 A1 | 7/2003 | Borthwick | |
| 2003/0171942 A1 | 9/2003 | Gaito | |
| 2003/0172053 A1 | 9/2003 | Fairweather | |
| 2003/0177112 A1* | 9/2003 | Gardner | G06F 19/28 |
| 2003/0182313 A1 | 9/2003 | Federwisch et al. | |
| 2003/0212718 A1 | 11/2003 | Tester | |
| 2004/0003009 A1 | 1/2004 | Wilmot | |
| 2004/0006523 A1 | 1/2004 | Coker | |
| 2004/0034570 A1 | 2/2004 | Davis | |
| 2004/0044992 A1 | 3/2004 | Muller et al. | |
| 2004/0083466 A1 | 4/2004 | Dapp et al. | |
| 2004/0088177 A1 | 5/2004 | Travis et al. | |
| 2004/0117387 A1 | 6/2004 | Civetta et al. | |
| 2004/0153451 A1 | 8/2004 | Phillips et al. | |
| 2004/0210763 A1 | 10/2004 | Jonas | |
| 2004/0221223 A1 | 11/2004 | Yu et al. | |
| 2004/0236688 A1 | 11/2004 | Bozeman | |
| 2005/0010472 A1 | 1/2005 | Quatse et al. | |
| 2005/0039119 A1 | 2/2005 | Parks et al. | |
| 2005/0091420 A1 | 4/2005 | Snover et al. | |
| 2005/0097441 A1 | 5/2005 | Herbach et al. | |
| 2005/0102328 A1 | 5/2005 | Ring et al. | |
| 2005/0131935 A1 | 6/2005 | O'Leary et al. | |
| 2005/0183005 A1 | 8/2005 | Denoue et al. | |
| 2005/0262493 A1 | 11/2005 | Schmidt et al. | |
| 2005/0262512 A1 | 11/2005 | Schmidt et al. | |
| 2006/0010130 A1 | 1/2006 | Leff et al. | |
| 2006/0080283 A1 | 4/2006 | Shipman | |
| 2006/0080316 A1 | 4/2006 | Gilmore et al. | |
| 2006/0143075 A1 | 6/2006 | Carr et al. | |
| 2006/0178954 A1 | 8/2006 | Thukral et al. | |
| 2006/0218206 A1 | 9/2006 | Bourbonnais et al. | |
| 2006/0218491 A1 | 9/2006 | Grossman et al. | |
| 2006/0253502 A1 | 11/2006 | Raman et al. | |
| 2007/0000999 A1 | 1/2007 | Kubo et al. | |
| 2007/0067285 A1 | 3/2007 | Blume | |
| 2007/0074169 A1 | 3/2007 | Chess et al. | |
| 2007/0078872 A1 | 4/2007 | Cohen | |
| 2007/0112714 A1 | 5/2007 | Fairweather | |
| 2007/0162454 A1 | 7/2007 | D'Albora et al. | |
| 2007/0178501 A1 | 8/2007 | Rabinowitz et al. | |
| 2007/0192122 A1 | 8/2007 | Routson et al. | |
| 2007/0233709 A1 | 10/2007 | Abnous et al. | |
| 2007/0233756 A1 | 10/2007 | D'Souza et al. | |
| 2007/0271317 A1 | 11/2007 | Carmel | |
| 2007/0284433 A1 | 12/2007 | Domenica et al. | |
| 2007/0295797 A1 | 12/2007 | Herman et al. | |
| 2007/0299697 A1 | 12/2007 | Friedlander et al. | |
| 2008/0005063 A1 | 1/2008 | Seeds | |
| 2008/0126344 A1 | 5/2008 | Hoffman et al. | |
| 2008/0126951 A1 | 5/2008 | Sood et al. | |
| 2008/0140387 A1* | 6/2008 | Linker | G06F 17/28 704/9 |
| 2008/0148398 A1 | 6/2008 | Mezack et al. | |
| 2008/0195672 A1 | 8/2008 | Hamel et al. | |
| 2008/0208735 A1 | 8/2008 | Balet et al. | |
| 2008/0228467 A1 | 9/2008 | Womack et al. | |
| 2008/0267386 A1 | 10/2008 | Cooper | |
| 2008/0270316 A1 | 10/2008 | Guidotti et al. | |
| 2008/0281580 A1* | 11/2008 | Zabokritski | G06F 17/271 704/9 |
| 2008/0313132 A1 | 12/2008 | Hao et al. | |
| 2009/0055487 A1 | 2/2009 | Moraes et al. | |
| 2009/0094270 A1 | 4/2009 | Alirez et al. | |
| 2009/0106178 A1 | 4/2009 | Chu | |
| 2009/0106242 A1 | 4/2009 | McGrew | |
| 2009/0112745 A1 | 4/2009 | Stefanescu | |
| 2009/0157732 A1 | 6/2009 | Hao et al. | |
| 2009/0164387 A1 | 6/2009 | Armstrong et al. | |
| 2009/0172821 A1 | 7/2009 | Daira et al. | |

(56) References Cited

U.S. PATENT DOCUMENTS

| | | | |
|---|---|---|---|
| 2009/0177962 A1 | 7/2009 | Gusmorino et al. | |
| 2009/0187546 A1 | 7/2009 | Whyte et al. | |
| 2009/0228507 A1* | 9/2009 | Jain | G06F 17/2705 |
| 2009/0249244 A1 | 10/2009 | Robinson et al. | |
| 2009/0254970 A1 | 10/2009 | Agarwal et al. | |
| 2009/0271343 A1 | 10/2009 | Vaiciulis et al. | |
| 2009/0299830 A1 | 12/2009 | West et al. | |
| 2009/0307049 A1 | 12/2009 | Elliott et al. | |
| 2009/0313311 A1 | 12/2009 | Hoffmann et al. | |
| 2009/0313463 A1 | 12/2009 | Pang et al. | |
| 2010/0011282 A1 | 1/2010 | Dollard et al. | |
| 2010/0057622 A1 | 3/2010 | Faith et al. | |
| 2010/0070531 A1 | 3/2010 | Aymeloglu et al. | |
| 2010/0070842 A1 | 3/2010 | Aymeloglu et al. | |
| 2010/0082541 A1 | 4/2010 | Kottomtharayil | |
| 2010/0082671 A1 | 4/2010 | Li et al. | |
| 2010/0098318 A1 | 4/2010 | Anderson | |
| 2010/0114817 A1 | 5/2010 | Broeder et al. | |
| 2010/0114831 A1 | 5/2010 | Gilbert et al. | |
| 2010/0145909 A1 | 6/2010 | Ngo | |
| 2010/0204983 A1 | 8/2010 | Chung et al. | |
| 2010/0306285 A1 | 12/2010 | Shah et al. | |
| 2010/0313119 A1 | 12/2010 | Baldwin et al. | |
| 2011/0066497 A1 | 3/2011 | Gopinath et al. | |
| 2011/0093327 A1 | 4/2011 | Fordyce et al. | |
| 2011/0099133 A1 | 4/2011 | Chang et al. | |
| 2011/0173093 A1 | 7/2011 | Psota et al. | |
| 2011/0208565 A1 | 8/2011 | Ross et al. | |
| 2011/0208822 A1 | 8/2011 | Rathod | |
| 2011/0252282 A1 | 10/2011 | Meek et al. | |
| 2011/0258216 A1 | 10/2011 | Supakkul et al. | |
| 2012/0013684 A1 | 1/2012 | Robertson et al. | |
| 2012/0022945 A1 | 1/2012 | Falkenborg et al. | |
| 2012/0059853 A1 | 3/2012 | Jagota | |
| 2012/0078595 A1 | 3/2012 | Balandin et al. | |
| 2012/0084287 A1 | 4/2012 | Lakshminarayan et al. | |
| 2012/0137235 A1 | 5/2012 | TS et al. | |
| 2012/0191446 A1* | 7/2012 | Binsztok | G06F 8/30 704/9 |
| 2012/0215784 A1 | 8/2012 | King et al. | |
| 2012/0221553 A1 | 8/2012 | Wittmer et al. | |
| 2012/0304150 A1 | 11/2012 | Leithead et al. | |
| 2013/0006947 A1 | 1/2013 | Akinyemi et al. | |
| 2013/0024268 A1 | 1/2013 | Manickavelu | |
| 2013/0086482 A1 | 4/2013 | Parsons | |
| 2013/0091084 A1 | 4/2013 | Lee | |
| 2013/0096968 A1 | 4/2013 | Van Pelt et al. | |
| 2013/0097130 A1 | 4/2013 | Bingol et al. | |
| 2013/0124193 A1* | 5/2013 | Holmberg | G06F 17/27 704/9 |
| 2013/0132348 A1 | 5/2013 | Garrod | |
| 2013/0151453 A1 | 6/2013 | Bhanot et al. | |
| 2013/0166480 A1 | 6/2013 | Popescu et al. | |
| 2013/0225212 A1 | 8/2013 | Khan | |
| 2013/0226879 A1 | 8/2013 | Talukder et al. | |
| 2013/0226944 A1 | 8/2013 | Baid et al. | |
| 2013/0246316 A1 | 9/2013 | Zhao et al. | |
| 2013/0251233 A1 | 9/2013 | Yang et al. | |
| 2013/0263019 A1 | 10/2013 | Castellanos et al. | |
| 2013/0275446 A1 | 10/2013 | Jain et al. | |
| 2014/0006404 A1 | 1/2014 | McGrew et al. | |
| 2014/0047319 A1 | 2/2014 | Eberlein | |
| 2014/0108074 A1 | 4/2014 | Miller et al. | |
| 2014/0222793 A1 | 8/2014 | Sadkin et al. | |
| 2014/0244388 A1 | 8/2014 | Manouchehri et al. | |
| 2014/0280255 A1 | 9/2014 | Elliot | |
| 2014/0358829 A1 | 12/2014 | Hurwitz | |
| 2015/0012509 A1 | 1/2015 | Kirn | |
| 2015/0046481 A1 | 2/2015 | Elliot | |
| 2015/0100559 A1 | 4/2015 | Nassar | |
| 2015/0106379 A1 | 4/2015 | Elliot et al. | |
| 2015/0142766 A1 | 5/2015 | Jain et al. | |
| 2015/0261847 A1 | 9/2015 | Ducott et al. | |

FOREIGN PATENT DOCUMENTS

| | | |
|---|---|---|
| DE | 102014204827 | 9/2014 |
| DE | 102014204830 | 9/2014 |
| DE | 102014204834 | 9/2014 |
| DE | 102014204840 | 9/2014 |
| DE | 102014213036 | 1/2015 |
| DE | 102014215621 | 2/2015 |
| EP | 2221725 | 8/2010 |
| EP | 2487610 | 8/2012 |
| EP | 2778913 | 9/2014 |
| EP | 2778914 | 9/2014 |
| EP | 2778986 | 9/2014 |
| EP | 2911078 | 8/2015 |
| GB | 2366498 | 3/2002 |
| GB | 2513007 | 10/2014 |
| GB | 2513472 | 10/2014 |
| GB | 2513721 | 11/2014 |
| GB | 2517582 | 2/2015 |
| GB | 2518745 | 4/2015 |
| NL | 2013134 | 1/2015 |
| NL | 2013306 | 2/2015 |
| WO | WO 02/35376 | 5/2002 |
| WO | WO 03/060751 | 7/2003 |
| WO | WO 2008/064207 | 5/2008 |
| WO | WO 2009/051987 | 4/2009 |
| WO | WO 2010/030919 | 3/2010 |
| WO | WO 2011/071833 | 6/2011 |

OTHER PUBLICATIONS

"A Tour of Pinboard," <http://pinboard.in/tour> as printed May 15, 2014 in 6 pages.

"BackTult—JD Edwards One World Version Control System," printed Jul. 23, 2007 in 1 page.

Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.

Delicious, <http://delicious.com/> as printed May 15, 2014 in 1 page.

"E-MailRelay," <http://web.archive.org/web/20080821175021/http://emailrelay.sourceforge.net/> Aug. 21, 2008, pp. 2.

Geiger, Jonathan G., "Data Quality Management, The Most Critical Initiative You Can Implement," Data Warehousing, Management and Quality, Paper 098-29, SUGI 29, Intelligent Solutions, Inc., Bounder, CO, pp. 14, accessed Oct. 3, 2013.

Gu et al., "Record Linkage: Current Practice and Future Directions," Jan. 15, 2004, pp. 32.

Hua et al., "A Multi-attribute Data Structure with Parallel Bloom Filters for Network Services", 2006, pp. 277-288.

Johnson, Maggie "Introduction to YACC and Bison", Handout 13, Jul. 8, 2005 (11 pages).

Kahan et al., "Annotea: an Open RDF Infastructure for Shared Web Annotations", Computer Networks, Elsevier Science Publishers B.V., vol. 39, No. 5, dated Aug. 5, 2002, pp. 589-608.

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontoloty Management System (Design)," Information Societies Technology Programme, Jan. 10, 2002, pp. 1-27.

Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.

Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.

Miklau et al., "Securing History: Privacy and Accountability in Database Systems," 3rd Biennial Conference on Innovative Data Systems Research (CIDR), Jan. 7-10, 2007, Asilomar, California, pp. 387-396.

(56) References Cited

OTHER PUBLICATIONS

Morrison et al., "Converting Users to Testers: An Alternative Approach to Load Test Script Creation, Parameterization and Data Corellation," CCSC: Southeastern Conference, JCSC 28, Dec. 2, 2012, pp. 188-196.
Nadeau et al., "A Survey of Named Entity Recognition and Classification," Jan. 15, 2004, pp. 20.
Niepert et al., "A Dynamic Ontology for a Dynamic Reference Work", Joint Conference on Digital Libraries, Jun. 17-22, 2007, Vancouver, British Columbia, Canada, pp. 1-10.
Nin et al., "On the Use of Semantic Blocking Techniques for Data Cleansing and Integration," 11th International Database Engineering and Applications Symposium, 2007, pp. 9.
Nivas, Tuli, "Test Harness and Script Design Principles for Automated Testing of non-GUI or Web Based Applications," Performance Lab, Jun. 2011, pp. 30-37.
Palantir, "Extracting and Transforming Data with Kite," Palantir Technologies, Inc., Copyright 2010, pp. 38.
Palantir, "Kite," https://docs.palantir.com/gotham/3.11.1.0/adminreference/datasources.11 printed Aug. 30, 2013 in 2 pages.
Palantir, "Kite Data-Integration Process Overview," Palantir Technologies, Inc., Copyright 2010, pp. 48.
Palantir, "Kite Operations," Palantir Technologies, Inc., Copyright 2010, p. 1.
Palantir, "The Repository Element," https://docs.palantir.com/gotham/3.11.1.0/dataguide/kite_config_file.04 printed Aug. 30, 2013 in 2 pages.
Palantir, "Write a Kite Configuration File in Eclipse," Palantir Technologies, Inc., Copyright 2010, pp. 2.
Palantir, http://docs.palantir.com/gotham/3.11.1.0/dataquide/baggage/KiteSchema.xsd, printed Aug. 30, 2013 (1 page).
Palantir, https://docs.palantir.com/gotham/3.11.1.0/dataguide/baggage/KiteSchema.xsd printed Apr. 4, 2014 (4 pages).
Palermo, Christopher J., "Memorandum," [Disclosure relating to U.S. Appl. No. 13/916,447, filed Jun. 12, 2013, and related applications], Jan. 31, 2014 in 3 pages.
Wollrath et al., "A Distributed Object Model for the Java System," Conference on Object-Oriented Technologies and Systems, Jun. 17-21, 1996, pp. 219-231.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
Official Communication for New Zealand Patent Application No. 622389 dated Mar. 20, 2014.
Official Communication for New Zealand Patent Application No. 622404 dated Mar. 20, 2014.
Extended European Search Report for European Patent Application No. 14158958.0 dated Jun. 3, 2014.
Extended European Search Report for European Patent Application No. 14158977.0 dated Jun. 10, 2014.
European Search Report for European Patent Application No. 09813700.3 dated Apr. 3, 2014.
Official Communication for New Zealand Patent Application No. 622439 dated Mar. 24, 2014.
Official Communication for New Zealand Patent Application No. 622439 dated Jun. 6, 2014.
Official Communication for New Zealand Patent Application No. 622473 dated Mar. 27, 2014.
Official Communication for New Zealand Patent Application No. 622473 dated Jun. 19, 2014.
Official Communication for Great Britain Patent Application No. 1404499.4 dated Aug. 20, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Canadian Patent Application No. 2666364 dated Jun. 4, 2012.
Notice of Allowance for U.S. Appl. No. 14/044,800 dated Sep. 2, 2014.
Official Communication for Great Britain Patent Application No. 1404479.6 dated Aug. 12, 2014.
Official Communication for New Zealand Patent Application No. 622497 dated Mar. 26, 2014.
Official Communication for New Zealand Patent Application No. 622497 dated Jun. 19, 2014.
Official Communication for New Zealand Patent Application No. 622414 dated Mar. 24, 2014.
Official Communication for New Zealand Patent Application No. 622484 dated Apr. 2, 2014.
Official Communication for European Patent Application No. 14159629.6 dated Jul. 31, 2014.
Chaudhuri et al., "An Overview of Business Intelligence Technology," Communications of the ACM, Aug. 2011, vol. 54, No. 8.
Johnson, Steve, "Access 2013 on demand," Access 2013 on Demand, May 9, 2013, Que Publishing.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.
Sekine et al., "Definition, Dictionaries and Tagger for Extended Named Entity Hierarchy," May 2004, pp. 1977-1980.
Symantec Corporation, "E-Security Begins with Sound Security Policies," Announcement Symantec, Jun. 14, 2001.
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Notice of Acceptance for Australian Patent Application No. 2014203669 dated Jan. 21, 2016.
Official Communication for Australian Patent Application No. 2014201506 dated Feb. 27, 2015.
Official Communication for Australian Patent Application No. 2014201507 dated Feb. 27, 2015.
Official Communication for Australian Patent Application No. 2014201580 dated Feb. 27, 2015.
Official Communication for Australian Patent Application No. 2014203669 dated May 29, 2015.
Official Communication for European Patent Application No. 14158977.0 dated Apr. 16, 2015.
Official Communication for European Patent Application No. 14158958.0 dated Apr. 16, 2015.
Official Communication for European Patent Application No. 15155845.9 dated Oct. 6, 2015.
Official Communication for Great Britain Patent Application No. 1411984.6 dated Dec. 22, 2014.
Official Communication for Great Britain Patent Application No. 1413935.6 dated Jan. 27, 2015.
Official Communication for Great Britain Patent Application No. 1404486.1 dated May 21, 2015.
Official Communication for Great Britain Patent Application No. 1404489.5 dated May 21, 2015.
Official Communication for Great Britain Patent Application No. 1404499.4 dated Jun. 11, 2015.
Official Communication for Great Britain Patent Application No. 1404479.6 dated Jul. 9, 2015.
Official Communication for Great Britain Patent Application No. 1413935.6 dated Dec. 21, 2015.
Official Communication for Great Britain Patent Application No. 1411984.6 dated Jan. 8, 2016.
Official Communication for Israel Patent Application No. 198253 dated Nov. 24, 2014.
Official Communication for Israel Patent Application No. 198253 dated Jan. 12, 2016.
Official Communication for Netherlands Patent Application No. 2013134 dated Apr. 20, 2015.
Official Communication for Netherlands Patent Application No. 2013306 dated Apr. 24, 2015.
Official Communication for Netherlands Patents Application No. 2012421 dated Sep. 18, 2015.
Official Communication for Netherlands Patents Application No. 2012417 dated Sep. 18, 2015.

(56) References Cited

OTHER PUBLICATIONS

Official Communication for Netherlands Patent Application No. 2012438 dated Sep. 21, 2015.
Official Communication for Netherlands Patent Application No. 2012434 dated Jan. 8, 2016.
Official Communication for New Zealand Patent Application No. 622513 dated Apr. 3, 2014.
Official Communication for New Zealand Patent Application No. 628161 dated Aug. 25, 2014.
Notice of Allowance for U.S. Appl. No. 14/304,741 dated Apr. 7, 2015.
Notice of Allowance for U.S. Appl. No. 14/508,696 dated Jul. 27, 2015.
Notice of Allowance for U.S. Appl. No. 14/148,568 dated Aug. 26, 2015.
Notice of Allowance for U.S. Appl. No. 14/533,433 dated Sep. 1, 2015.
Notice of Allowance for U.S. Appl. No. 14/552,336 dated Nov. 3, 2015.
Notice of Allowance for U.S. Appl. No. 12/556,307 dated Jan. 4, 2016.
Notice of Allowance for U.S. Appl. No. 14/094,418 dated Jan. 25, 2016.
Notice of Allowance for U.S. Appl. No. 12/556,307 dated Mar. 21, 2016.
Official Communication for U.S. Appl. No. 14/304,741 dated Aug. 6, 2014.
Official Communication for U.S. Appl. No. 14/148,568 dated Oct. 22, 2014.
Official Communication for U.S. Appl. No. 13/827,491 dated Dec. 1, 2014.
Official Communication for U.S. Appl. No. 14/508,696 dated Mar. 2, 2015.
Official Communication for U.S. Appl. No. 14/304,741 dated Mar. 3, 2015.
Official Communication for U.S. Appl. No. 14/571,098 dated Mar. 11, 2015.
Official Communication for U.S. Appl. No. 14/148,568 dated Mar. 26, 2015.
Official Communication for U.S. Appl. No. 12/556,307 dated Jun. 9, 2015.
Official Communication for U.S. Appl. No. 14/014,313 dated Jun. 18, 2015.
Official Communication for U.S. Appl. No. 13/827,491 dated Jun. 22, 2015.
Official Communication for U.S. App. No. 14/552,336 dated Jul. 20, 2015.
Official Communication for U.S. App. No. 14/571,098 dated Aug. 5, 2015.
Official Communication for U.S. App. No. 14/571,098 dated Aug. 24, 2015.
Official Communication for U.S. App. No. 14/025,653 dated Oct. 6, 2015.
Official Communication for U.S. App. No. 14/134,558 dated Oct. 7, 2015.
Official Communication for U.S. App. No. 13/827,491 dated Oct. 9, 2015.
Official Communication for U.S. Appl. No. 14/571,098 dated Nov. 10, 2015.
Official Communication for U.S. Appl. No. 14/800,447 dated Dec. 10, 2015.
Official Communication for U.S. Appl. No. 14/631,633 dated Feb. 3, 2016.
Official Communication for U.S. Appl. No. 14/571,098 dated Feb. 23, 2016.
Official Communication for U.S. Appl. No. 14/014,313 dated Feb. 26, 2016.
Official Communication for U.S. Appl. No. 14/025,653 dated Mar. 3, 2016.
Official Communication for U.S. Appl. No. 12/556,307 dated Sep. 2, 2011.
Official Communication for U.S. Appl. No. 12/556,307 dated Feb. 13, 2012.
Official Communication for U.S. Appl. No. 12/556,307 dated Oct. 1, 2013.
Official Communication for U.S. Appl. No. 12/556,307 dated Mar. 14, 2014.

* cited by examiner

METHOD AND SYSTEM FOR GENERATING A PARSER AND PARSING COMPLEX DATA

REFERENCE TO RELATED APPLICATIONS

This application is a continuation of U.S. Non-Provisional application Ser. No. 14/187,164, filed on Feb. 21, 2014, which is a continuation of U.S. Non-Provisional application Ser. No. 14/173,743, filed on Feb. 5, 2014, now U.S. Pat. No. 8,855,999, issued on Oct. 7, 2014, which claims the benefit of priority to U.S. Provisional Patent Application No. 61/801,432, filed on Mar. 15, 2013, the contents of which are expressly incorporated herein by reference in their entireties.

BACKGROUND

The amount of information being processed and stored is rapidly increasing as technology advances present an ever-increasing ability to generate and store data. Additionally, computer systems are becoming increasingly integrated so a need exists to correctly, but efficiently, integrate data from one system into another system. Ensuring translation correctness can require considerable software development expense, which is in tension with a need to perform this conversion with commercial efficiency.

One common type of data format conversion is converting data from a first textual format to a second textual format. Examples of such conversion are readily apparent in all commercial, educational, political, and technical fields. For example, an electronic record for a credit card purchase can be comprised in part of several textual fields, including the name of the card holder, an identifying number for the credit card used in the transaction, and merchant information identifying the nature of the purchase and identifying the merchant. Consumers frequently track their credit card purchases through online billpay or online banking software, but the textual format of credit card transaction data within the online billpay environment can differ from the textual format of credit card transaction data within the environment of the originating credit card processor. Thus, data format conversion is needed to integrate data formatted consistent with a credit card company's computing environment with the computing environment of a consumer's online billpay application. Fortunately for billpay software providers, the format of credit card transaction data is relatively straightforward and is relatively stable compared to other data conversion environments.

Some data conversion environments have very complex data conversion requirements and these data conversion requirements can be subject to frequent revision. Complex data conversion requirements and frequently changing data conversion requirements can arise in situations where a parser must process data from numerous independent sources, each of which can format their data in arbitrarily complex forms and can add new formats or change existing formats with arbitrary frequency. As the number of different formats a parser must support increases, the complexity of the parser increases. As the complexity of the parser increases, the software development resources required to update and test the parser can increase dramatically. Thus, increasing parser complexity is in tension with both goals of reliable and commercially efficient data translation.

Existing parsing tools do not perform well in complex parsing environments that frequently change. One traditional approach to designing a text parser is for a software developer to write regular expressions that will recognize strings or portions of a string and modify those strings or portions of a string by a predefined transformation. One problem with this approach is that regular expression transformations can provide efficient and correct solutions for relatively simple data conversions, but complex transformations using regular expression can be very difficult to write, test, modify, and/or interpret. Moreover, in some data conversion environments, a result generated by one regular expression transformation can be an input to another regular expression transformation, which tends to significantly increase the conceptual complexity and practical expense of developing and maintaining a parser based on regular expressions.

BRIEF DESCRIPTION OF THE DRAWINGS

Reference will now be made to the accompanying drawings showing example embodiments of the present application, and in which.

DETAILED DESCRIPTION OF EXEMPLARY EMBODIMENTS

Figure 1:
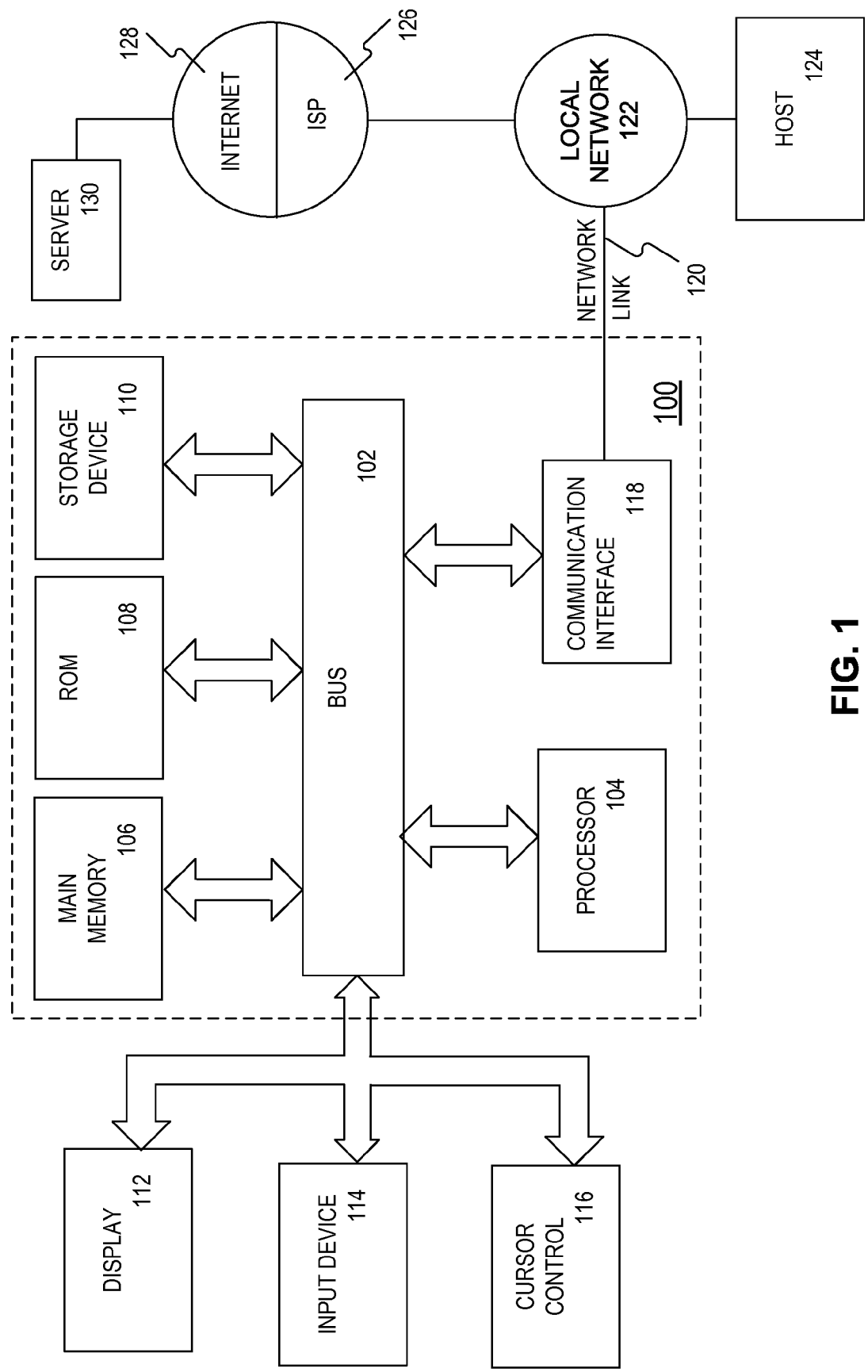
FIG. 1 illustrates a computing environment for receiving a parser definition, generating a parser, and parsing text data with the generated parser, consistent with some embodiments of the present disclosure.

Reference will now be made in detail to the embodiments, the examples of which are illustrated in the accompanying drawings. Whenever possible, the same reference numbers will be used throughout the drawings to refer to the same or like parts.

Embodiments of the present disclosure can avoid the shortcomings of traditional text parsers by providing systems and methods for defining, constructing, and utilizing a parser in ways that allow for greater parsing complexity and flexibility, while also allowing for more efficient design and modification of the parser. Embodiments of the present disclosure encompass techniques for receiving a parsing definition, generating a parser from the parsing definition, and utilizing the generated parser to perform text transformations of greater complexity than would have been practical with traditional parsers. Although the following description concerns certain exemplary embodiments, it will be appreciated that modifications and variations of the disclosed embodiments may be made consistent with the teachings of the present disclosure.

Embodiments consistent with the present disclosure can receive as input and generate as output information in one or more forms. In some embodiments, a text parser receives text data in some form as input and generates as output a data structure, a text report documenting observed structure, and/or an image depicting a result of the parsing. The outputted data structure can be, for example, a parse tree, an abstract syntax tree, or some other data structure. In some embodiments, input data can take the form of a file containing textual data, a stream of textual data communicated from one program or process on a computer to another program or process on the same computer or a different computer, or textual data stored in a database. In some embodiments, output data emitted from a text parser can also take one or more of the forms described above. In some embodiments, a parser can receive input data and emit output data in the same format while in other embodiments the format of the input data can differ from the format of the output data. Although parsers can typically receive data in a single form and emit data in a single form, a parser consistent with the present disclosure could receive textual data from one or more inputs and/or could emit textual data in one or more forms as outputs.

In some embodiments, a parser can generate data other than textual data as an output. Some parsers are designed to recognize textual patterns and communicate logical indicators when one or more textual patterns are present within a textual input string. For example, a parser can output a logical indication reflecting that a predetermined text string is present or absent from input data. In another example, a parser can output a logical indication reflecting that a first string precedes a second string within the input data.

In some embodiments, more than one logical indication can be output from a parser. For example, a parser can output a first logical indication reflecting that a first predetermined text string is present or absent from input data and can also output a second logical indication reflecting that a second predetermined text string is present at a position prior to a third predetermined text string within the input data. Some embodiments of the present disclosure are of this type, as discussed in more detail below.

In some embodiments, a parser can receive one or more logical indications as inputs to a parser. For example, a parser can be configured to search for a first text string if an input logical indication is false but the parser can be configured to search for a second text string if the input logical indication is true.

In some embodiments, a parser can be configured to receive a text string indication as an input. For example, a parser can be configured to search for a text string that is received as an input to the parser—separate from data input to the parser. In some embodiments, other input indications such as integers or floating-point numbers can be received and utilized by a parser to influence the parser's operations. In some embodiments, a combination of two or more input indications of one or more types discussed above can be received by the parser and influence the parser's operations.

FIG. 1 illustrates an exemplary computing environment within which the embodiments of the present disclosure can be implemented.

Computer system 100 includes a bus 102 or other communication mechanism for communicating information, and one or more hardware processors 104 (denoted as processor 104 for purposes of simplicity) coupled with bus 102 for processing information. Hardware processor 104 can be, for example, one or more general-purpose microprocessors or it can be a reduced instruction set of one or more microprocessors.

Computer system 100 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions by processor 104. Such instructions, when stored in non-transitory storage media accessible to processor 104, render computer system 100 into a special-purpose machine that is customized to perform the operations specified in the instructions.

Computer system 100 further includes a read only memory (ROM) 108 or other static storage device coupled to bus 102 for storing static information and instructions for processor 104. A storage device 110, such as a magnetic disk, optical disk, or USB thumb drive (Flash drive), etc. is provided and coupled to bus 102 for storing information and instructions.

Computer system 100 can be coupled via bus 102 to a display 112, such as a cathode ray tube (CRT), an LCD display, or a touchscreen for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as a cursor control can be implemented via receiving touches on a touch screen without a cursor.

Computing system 100 can include a user interface module to implement a GUI that can be stored in a mass storage device as executable software codes that are executed by the one or more computing devices. This and other modules can include, by way of example, software components, object-oriented software components, class and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

Computer system 100 can implement the processes and techniques described herein using customized hard-wired logic, one or more ASICs or FPGAs, firmware and/or program logic which in combination with the computer system causes or programs computer system 100 to be a special-purpose machine. According to some embodiments, the techniques and other features described herein are performed by computer system 100 in response to processor 104 executing one or more sequences of one or more instructions contained in main memory 106. Such instructions can be read into main memory 106 from another storage medium, such as storage device 110. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media includes, for example, optical or magnetic disks, such as storage device 110. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but can be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 sends and receives electrical, electromagnetic or optical signals that carry digital data streams representing various types of information.

Network link 120 typically provides data communication through one or more networks to other data devices. For example, network link 120 can provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. The received code can be executed by processor 104 as it is received, and/or stored in storage device 110, or other non-volatile storage for later execution.

In some embodiments, computer system 100 receives a parser definition, generates a parser, and parses textual data using the generated parser. For example, a software developer can define a parser consistent with embodiments of the present disclosure by utilizing input device 114, cursor control 116, and/or display 112 to input a parser definition to processor 104.

In some embodiments, processor 104 stores the defined parser on storage device 110 or in main memory 106. In other embodiments, processor 104 can store a parser definition at a storage location coupled to processor 104 through network link 120, such as a hard disk on host 124. After the defined parser has been stored, processor 104 can receive the parser definition by executing instructions that read the defined parser from its storage location. In some embodiments, the storage location for the defined parser is one or more of storage device 110, ROM 108, or main memory 106. In other embodiments, processor 104 can read the defined parser from other locations within computer system 100. For example, processor 104 can read the defined parser from a file stored on host 124 or on server 130 through a networked file system such as NFS. In another example, the defined parser can be read through network link 120 using communication protocols such as FTP or a protocol associated with a distributed version control system, such as Git. In other examples, processor 104 can execute instructions that receive a defined parser through inter-process communication from another program being executed by processor 104 or through remote procedure calls with host 124 or server 130.

After processor 104 receives a parser definition, processor 104 can use the parser definition to generate a parser. Details relating to generating a parser from a parser definition are discussed below. In some embodiments, the generated parser can comprise instructions that are directly executable by one or more processors, such as processor 104. In other embodiments, the generated processor can comprise executable bytecode, including but not limited to Java bytecode that is executable by a Java virtual machine. In additional embodiments, the generated processor can comprise program statements in a high-level language such as C++ which can be compiled to form an executable parser program. In alternative embodiments, the generated processor can comprise program statements in an interpreted programming language such as Python or in a text processing language such as Sed. In some embodiments, the generated parser is constructed in an object-oriented language and the generated parser comprises an object with member functions that perform the processing discussed below. In other embodiments, the generated parser comprises one or more data structures, such as a "structure" in the C programming language, in addition to supporting functions that perform the processing discussed below.

After processor 104 generates the parser, processor 104 can parse textual data using the generated parser in the manner discussed in more detail below. The generated parser, when executed by processor 104, can receive textual input from any of the I/O mechanisms described above and can, in some embodiments, generate textual output through any of the I/O mechanisms discussed above. In some embodiments, also, the generated parser can generate one or more logical indicators, as previously discussed. A logical indicator can reflect that a predetermined condition existed during text processing.

An example of one such predetermined condition would be a logical value reflecting whether a telephone number represented an international number for a caller within the United States. In this example, the condition would have a value of "1" (i.e., TRUE) if the first three digits of a telephone number were "011" and the condition could have a value of "0" (i.e., FALSE) otherwise.

In some embodiments, logical values reflect cumulative information because communication of the logical value, such as the international calling logical value, can be cumulative to communication of other information that implies the condition, such as the phone number itself. In other embodiments, however, logical values are not cumulative to other information being communicated because the input string that led to the logical value being generated no longer exists. For example, a logical value can reflect that a particular sequence of text characters was recognized prior to that sequence of characters being reordered or changed by the parser. As discussed below, some embodiments of the present disclosure check for a condition reflecting that a string being parsed is within a predetermined class of strings notwithstanding that the string being parsed can be modified during processing.

In some embodiments, processor 104 generates the parser prior to performing a parsing operation. For example, initiation of a parsing operation can be preceded by generation of the parser. In other embodiments, processor 104 generates the parser as an explicit processing step separate from a parsing operation. For example, consistent with this embodiment, processor 104 can be directed to generate the parser as one processing operation and, thereafter, processor 104 can be directed to use the generated parser to parse textual information.

In some embodiments, a cache of generated parsers is maintained by computer system 100. In these embodiments, if the parser definition has not changed since the parser was last generated, regenerating the parser from the parser generation can be inefficient relative to reading the generated parser from a cache. Processor 104 can read the generated parser from the cache as an explicit step or as part of a parsing operation. In some embodiments, a least-recently-used replacement algorithm is used to determine which generated parsers to store in the cache at a particular time. In other embodiments, other replacement algorithms can be used for determining which generated parsers to store in the parser cache at a particular time. Caching mechanisms are well known in the art so the structural details of a cache and the steps for identifying an entry within the cache and reading from or storing to that entry within the cache are not discussed herein. A description of exemplary embodiments related to a parser definition follows.

In some embodiments, the structure of a parser is defined by textual information that reflects the components of the parser, the text processing that each component performs, and outputs that each component generates. In some embodiments, as discussed above, a parser can generate textual output and/or logical values as output. In some embodiments, a parser's output is defined within the parser definition.

Figure 2:
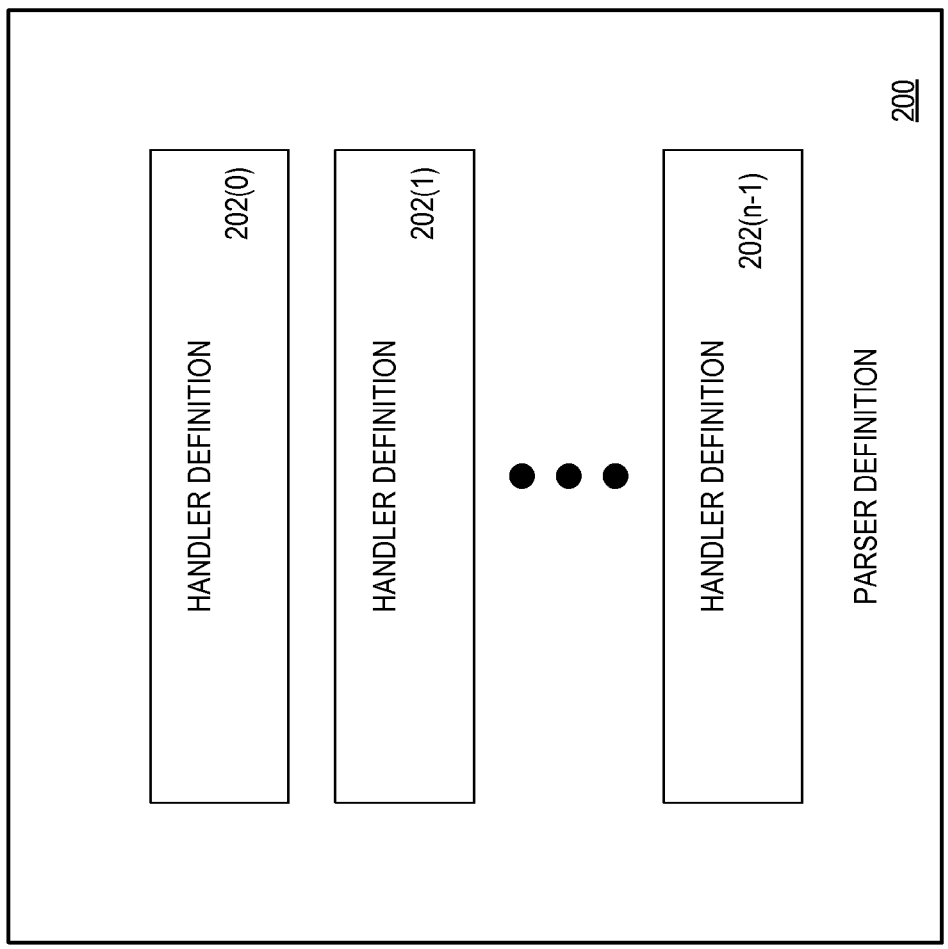
FIG. 2 illustrates a high-level diagram of the structure of an exemplary parser definition, consistent with some embodiments of the present disclosure.

FIG. 2 illustrates a high-level diagram of the structure of an exemplary parser definition 200, consistent with some embodiments of the present disclosure. As illustrated, the structure of parser definition 200 comprises one or more handler definitions. A handler, as discussed in further detail below, can be configured to recognize one or more text patterns as inputs and generate one or more text patterns as outputs. In some embodiments, the one or more handlers perform the functionality of the parser as a whole.

As also discussed below, in some embodiments, a handler can operate independently or can operate regeneratively. In the former scenario, a handler can generate at least one text string output or a logical condition that can be communicated to the output of the parser as a whole without influencing the behavior of other handlers. In the latter scenario, a handler can generate at least one text string that is input to the parsing pipeline, which can lead to at least one handler receiving the at least one text string as an input. Thus, in this latter scenario, the output of a handler influences the input to at least one handler. For example, as discussed further below, a handler can perform a "split" operation, which partitions a string into a plurality of substrings. Each substring generated by the split operation can directly or indirectly lead to one or more substrings being introduced into the pipeline for further parsing.

In the exemplary embodiment of FIG. 2, parser definition 200 comprises n handler definitions identified as handler definition 202(0) through handler definition 202(n−1). In some embodiments, the structure of parser definition 200 and handler definitions 202(0) to 202(n−1) can be expressed in a markup language. In some embodiments, the markup language used is XML while in other embodiments the markup language can be SGML, YAML, or another markup language.

Figure 3:
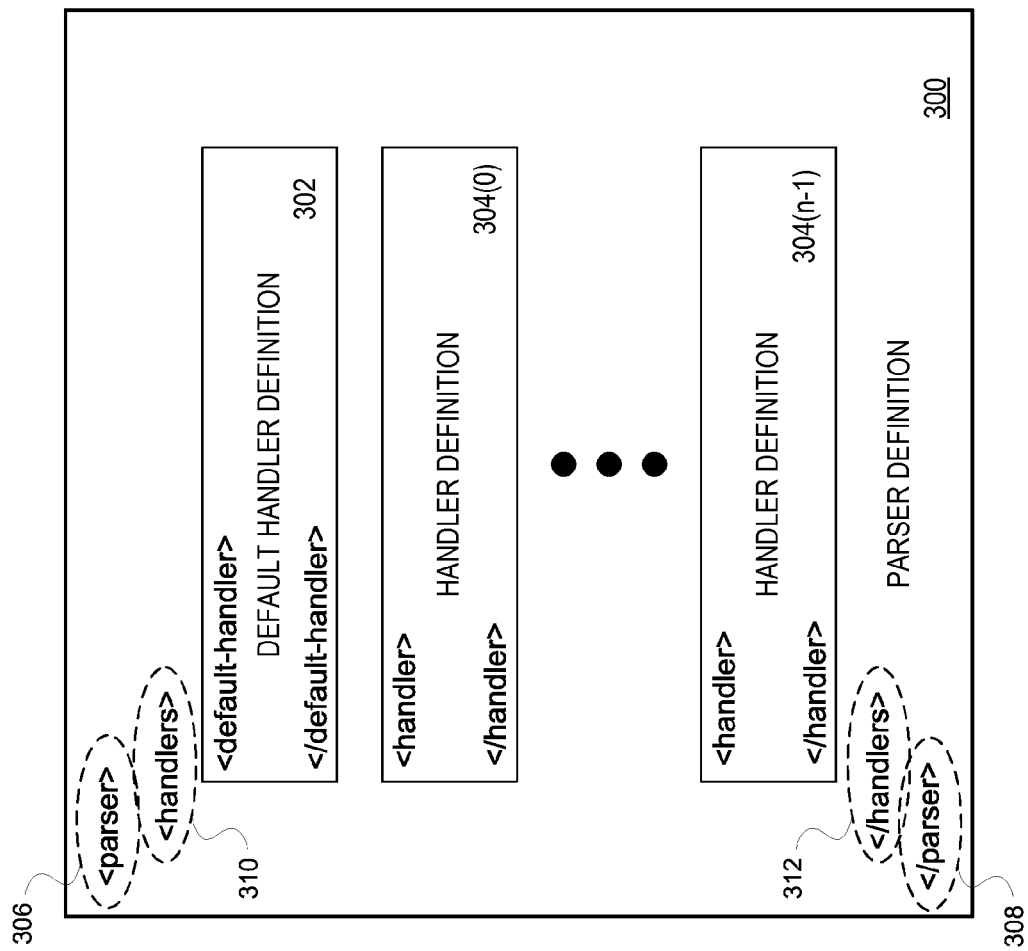
FIG. 3 illustrates a high-level diagram of the structure of an exemplary parser definition comprising markup tags, consistent with some embodiments of the present disclosure.

FIG. 3 illustrates a high-level diagram of the structure of an exemplary parser definition 300 comprising markup tags, consistent with embodiments of the present disclosure. As illustrated, in some embodiments, parser definition 300 comprises opening parser tag 306 ("<parser>") and closing parser tag 308 ("</parser>"). These tags can encapsulate information that defines the structure of the parser.

As illustrated, in some embodiments, parser definition 300 also comprises opening handlers tag 310 ("<handler>") and closing handlers tag 312 ("</handler>"). Such tags can encapsulate information that defines each of the handlers for the one or more handlers within parser definition 300.

In some embodiments, at least two types of handlers can be defined within parser definition 300. One type of handler is a "default handler." In some embodiments, a default handler performs an initial decomposition of a string into multiple constituent substrings, each of which is introduced into the processing pipeline for subsequent processing as discussed below. In other embodiments, the default handler performs a string modification and the modified string is introduced into the processing pipeline for subsequent processing as discussed below.

An example of a string decomposition operation is decomposing a 10-digit U.S. phone number into an area code, an exchange, and four digits for distinguishing customers within the exchange. A phone number can be represented as "XXX-XXX-XXXX", where each "X" represents an integer from zero through nine. Moreover the substrings within the phone number are delimited by the character "-" in this example. Thus, in this example, the first three integers reflect the area code, the second three integers reflect the exchange, and the remaining four integers distinguish between customers within the exchange. Each of these components could be output from a default handler as inputs to one or more subsequent handlers.

An example of a string modification operation is translating a string representing text in a first language into a string representing text in a second language. For example, the word "telephone" in English can be translated into Czech as "telefon." In this example, the output of a handler performing this translation could be an input to one or more subsequent handlers.

In some embodiments, a default handler is configured to parse a string if no other handler is configured to parse that string. For example, if a current input string to the processing pipeline was the string "Hello World" but none of handlers 304(0) to 304(n–1) were configured to parse the string "Hello World," the default handler could be invoked to parse that string. In some embodiments, a default handler can be invoked as an initial parsing step to split an initial input string into several substrings, each of which matches what a particular handler is configured to receive and further parse.

Figure 4:
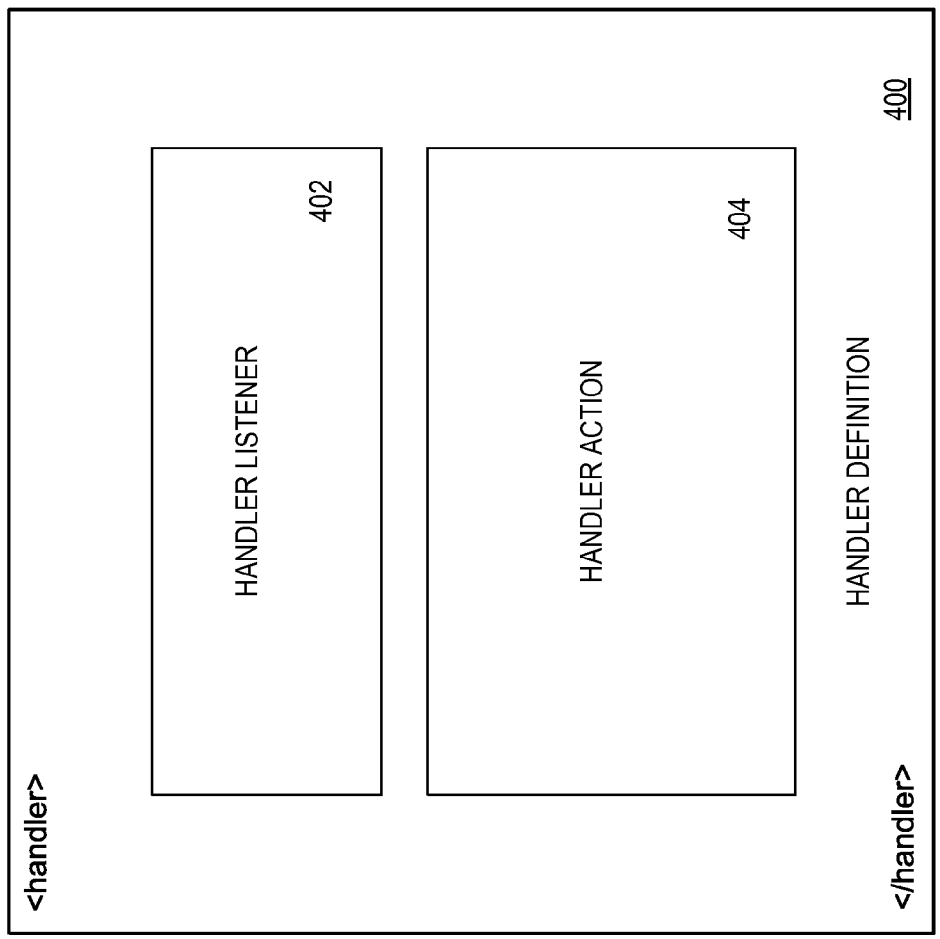
FIG. 4 illustrates a high-level diagram of the structure of an exemplary handler, consistent with some embodiments of the present disclosure.

FIG. 4 illustrates a high-level diagram of the structure of an exemplary handler definition 400, consistent with some embodiments of the present disclosure. As illustrated, handler definition 400 comprises handler listener 402 and handler action 404. As discussed further in conjunction with FIG. 5, handler listener 402 can define one or more predetermined input strings that a handler is configured to receive and parse. After receiving the one or more predetermined input strings as an input to the handler, as determined by handler listener 402, the handler can parse the input string through parsing operations defined within handler action 404.

Figure 5:
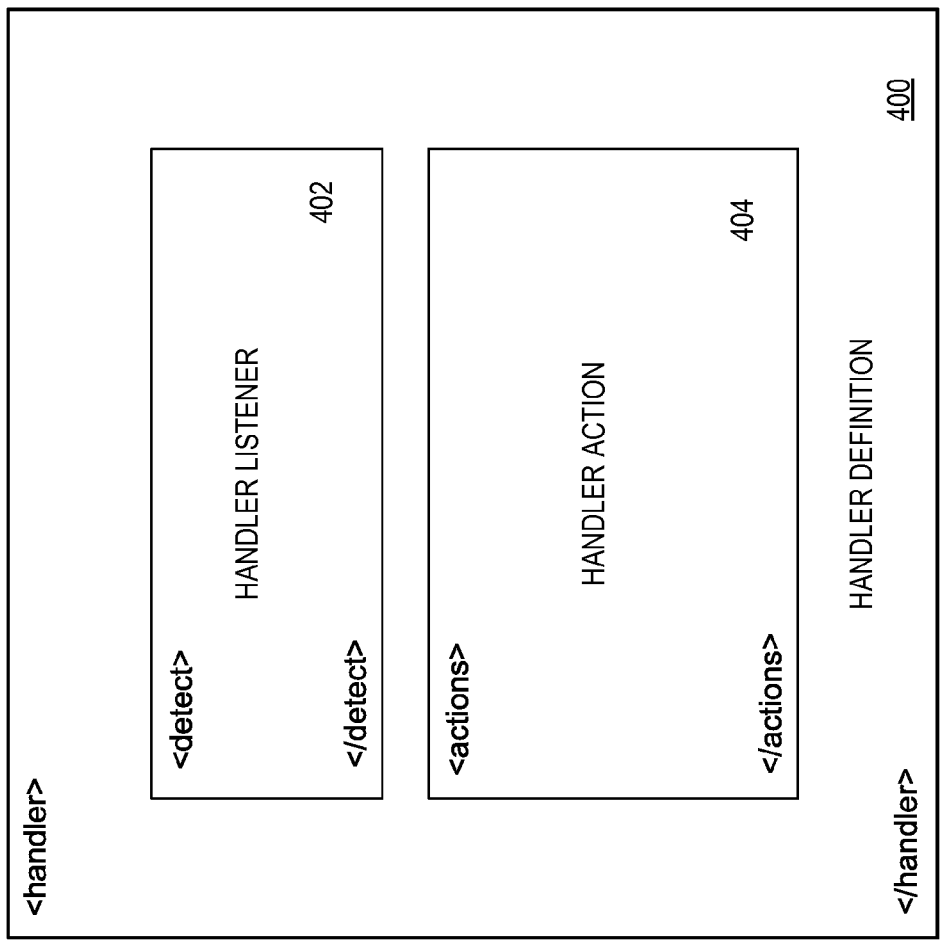
FIG. 5 illustrates a high-level diagram of the structure of an exemplary handler, consistent with some embodiments of the present disclosure.

FIG. 5 illustrates a high-level diagram of the structure of exemplary handler 400, consistent with embodiments of the present disclosure. As illustrated in FIG. 5, the definition of handler listener 402 comprises an opening detect tag ("<detect>") and a closing detect tag ("</detect>"). In some embodiments, these tags encapsulate information that defines the structure of the listener for a handler. As discussed below, the listener can be configured to match against one or more predetermined input strings. Some strings for which a listener can be configured to detect, consistent with certain embodiments, are discussed below.

As further shown in FIG. 5, handler action 404 comprises an opening action ("<action>") tag and a closing action tag ("</action>"). In this embodiment, these tags can encapsulate information that defines the parsing steps that a handler will perform when the handler's listener determines that the one or more input strings for which the handler's listener is configured to recognize are present on the input to the handler. Some actions that a parser can take in response to detecting a input string, consistent with certain embodiments, are discussed below.

In other embodiments, the text characters employed to form the opening and closing detect, actions, handler, and parser definitions can differ from the specific text characters described herein. For example, the actual characters of the opening and closing "detect" tags could be replaced with the characters of an opening and closing "listener" tag ("<listener>" and "</listener>") without departing from the spirit of the discussion above. In another example, the handler definition can be expressed in a form of expression other than XML, such as YAML or another markup language. The import of the discussion above is that one or more of parser, handler, listener, and action definitions can be present in a parser's definition but the actual text strings within tags or identifiers for each section, for embodiments employing tags or identifiers, respectively, is an implementation detail.

It is appreciated that other mechanisms for partitioning portions of a parser definition are known and within the spirit of the discussion above. For example, one or more portions of a parser definition can be expressed in files separate from other portions of the parser definition. In these examples, one or more portions of a parser definition can be present in a file separate from a file containing some or all of the remainder of the parser definition. For such examples, one or more files can be incorporated by reference into the parser definition.

In some embodiments, one or more of the following comparisons are supported by a listener within a handler:

| contains |
| prefix |
| endswith |

For the "contains" comparison, in some embodiments, an argument to the "contains" comparison can be a predetermined string to listen for; i.e., a predetermined string for the handler to compare against input strings the handler receives. In embodiments supporting the "contains" comparison, a listener definition for a handler can trigger the handler's actions by using the "contains" comparison to recognize that the predetermined string argument to the "contains" comparison is present somewhere within the input string to the handler; i.e., the handler executes its parsing actions if the input string contains the predetermined string argument. In some embodiments, the "contains" comparison is case sensitive while in other embodiments the "contains" comparison is case insensitive.

For example, a "contains" comparison can define that a handler should listen for any input string containing the text "state." A listener definition receiving input strings "the united states," "the president made a statement," and "a state of bliss" would execute an action corresponding to the handler with the "contains" comparison upon receiving each of those strings.

For the "prefix" comparison, in some embodiments, an argument to the "prefix" comparison can be a predetermined string to listen for. In embodiments supporting the "prefix" comparison, a listener definition for a handler can trigger the handler's actions by using the "prefix" comparison to recognize that the predetermined string argument to the "prefix" comparison is present at the beginning of the input string to the handler; i.e., the handler executes its parsing actions if the input string begins with the predetermined string argument. In some embodiments, the "prefix" comparison is case sensitive while in other embodiments the "prefix" comparison is case insensitive.

For example, a "prefix" comparison can define that a handler should listen for any input string beginning with the text "state." A listener definition receiving input strings "state of California," "statement by the president," and "stated preference" would execute an action corresponding to the handler with the "prefix" comparison upon receiving each of those strings.

For the "endswith" comparison, in some embodiments, an argument to the "endswith" comparison can be a predetermined string to listen for. In embodiments supporting the "endwith" comparison, a listener definition for a handler can trigger the handler's actions by using the "endwith" comparison to recognize that the predetermined string argument to the "endwith" comparison is present at the end of the input string to the handler; i.e., the handler executes its parsing actions if the input string ends with the predetermined string argument. In some embodiments, the "endswith" comparison is case sensitive while in other embodiments the "endswith" comparison is case insensitive.

For example, an "endswith" comparison can define that a handler should listen for any input string ending with the text "state." A listener definition receiving input strings "he has left the state," "interstate," and "the deceased was testate" would execute an action corresponding to the handler with the "endswith" comparison upon receiving each of those strings.

It is appreciated that other comparisons or other comparison names can also be used in accordance with the the embodiments described in the present disclosure. For example, the "endswith" comparison can be reflected in a handler listener definition through the identifier "trailing" rather than "endswith."

In some embodiments, one or more of the following actions are supported by a handler:

| chomp |
|---|
| emit |
| format |
| parse |
| replace |
| replace-{first,last,n} |
| split |
| trim |

For the "chomp" operation, in some embodiments, an argument to the "chomp" operation can be a predetermined string or regular expression to match against. In embodiments supporting the "chomp" operation, upon an input string to a handler listener matching the predetermined string or regular expression being detected within the handler's current input, the portion of the input string that matches the predetermined string or regular expression can be output to the start of the parsing pipeline. The string resulting from this operation is an input to subsequent actions for the handler or can be an input to a subsequent handler.

For the "emit" operation, in some embodiments, two forms of the emit operation can exist. One form of the "emit" operation can output a string generated by preceding parsing operations within the actions of the current handler. For example, if actions A, B, and C are actions within a handler and those actions modify the input string received by the handler, a subsequent "emit" operation can output the string resulting from the preceding parsing operations from the handler.

Another form of the "emit" operation, in some embodiments, can output a logical condition from the handler to the parser. This logical condition can reflect a current state of the parser or that a predetermined sequence of parsing operations was performed by the handler. In this form of the "emit" operation, an argument to the "emit" operation can be a logical category reflecting the type of logical condition to indicate upon execution of the emit operation. The logical category can be defined by a text string such as "Found: Hello World", reflecting that the substring "Hello World" was found within the input string to the handler.

For the "format" operation, in some embodiments, an argument to the "format" operation can be a predetermined formatting string that defines how the handler should output its output text. In some embodiments, a string substitution format can be utilized to define how strings should be output. For example, a format string for a handler can comprise the string "Found this text: % s," which indicates that the handler determined that a predetermined text string, located in a preceding action, should be output but preceded by a message reflecting the significance of that located text. As will be appreciated, the "% s" operator within this formatting string reflects a string substitution operation. Many other substitution operators are known in the art, such as integers ("% i"), real numbers ("% d"), characters ("% c"), and times and dates ("% t"). The string resulting from this operation is an input to subsequent actions for the handler or can be an input to a subsequent handler.

For the "parse" operation, in some embodiments, the current string(s) being processed by the handler are output to the parsing pipeline. As discussed elsewhere, some embodiments output strings to the start of the processing pipeline while other embodiments output strings to a predetermined stage within the processing pipeline. In embodiments that output a string to a predetermined stage within the processing pipeline, the target pipeline stage to receive the handler's output can be defined within the handler's definition as an argument to the "parse" operation.

In some embodiments, the "parse" operation can be appropriate for inclusion within a default handler because this configuration can condition and/or split a string received by a parser in a manner that allows the other handlers to efficiently perform their operations; i.e., an operation common to all parsing operations can be more efficiently included in a handler, such as the default handler, whose actions are executed prior to execution of actions by other handlers.

For the "replace" operation, in some embodiments, arguments to the "replace" operation can be a predetermined string to match against the input string to the replace operation and a predetermined string to replace with the string to be matched against. For example, a "replace" operation can have a predetermined string to match against of "ABC" and a predetermined string to replace with of "XYZ." Upon execution of the replace operation, the "ABC" string or substring within the input string to the replace operation can be replaced by the "XYZ" string. In some embodiments, a "replace" operation can be executed multiple times on the input string. For example, for an input string "ABCABC," a "replace" operation directing replacement of "ABC" with "XYZ" can generate "XYZXYZ." The string resulting from this operation is an input to subsequent actions for the handler or can be an input to a subsequent handler.

For the "replace-first" operation, in some embodiments, the operations described in conjunction with the "replace" operation are only performed on the first instance of a predetermined string within the input string. Other variants of this idea are a "replace-last" operation, reflecting operation on the last instance of a substring within a string, and "replace-n," reflecting operation on the nth instance of a substring within a string. In some embodiments, all "replace" operation variants are available while in other embodiments, only some "replace" operation variants are available.

For the "split" operation, in some embodiments, an argument to the "split" operation can be a predetermined delimiter character or string. In embodiments supporting the "split" operation, upon the predetermined delimiter character or string being detected within the handler's current input, the portion of the input string that precedes the predetermined delimiter character or string is separated from the portion of the input string that follows the predetermined delimiter character or string to form two substrings. In some embodiments, the "split" operation can operate multiple times on the input string. For example, a "split" operation on a U.S. telephone number, utilizing a "-" delimiter character, can split "123-456-7890" into substrings "123," "456," and "7890." The string(s) resulting from this operation can be an input to subsequent actions for the handler or can be an input to a subsequent handler.

In embodiments supporting the "trim" operation, this operation removes leading and trailing spaces from the input string to the action. The string resulting from this operation is an input to subsequent actions for the handler or can be an input to a subsequent handler.

Figure 6:
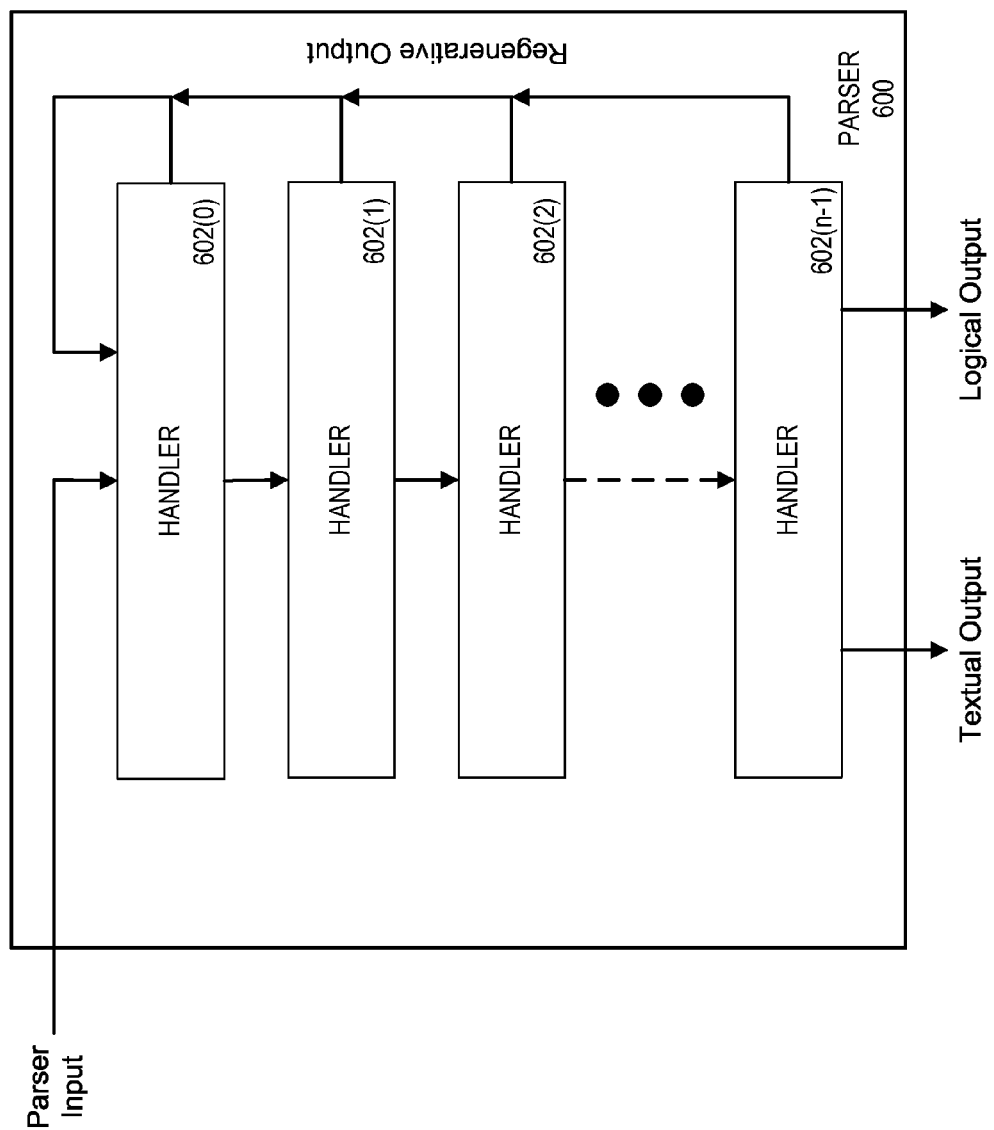
FIG. 6 illustrates the structure of an exemplary constructed parser, consistent with some embodiments of the present disclosure.

In some embodiments, the structure of the parser definition parallels the structure of a generated parser. FIG. 6 illustrates an exemplary generated parser 600 according to some embodiments. Those having skill in the art will recognize that other operations can also be used in accordance with the embodiments described in the present disclosure.

FIG. 6 illustrates the structure of a constructed parser 600, consistent with some embodiments of the present disclosure. As shown, parser 600 comprises a series of n handlers, identified as 602(0) through 602(n-1) in the figure. In some embodiments, parser 600 can be organized as a pipeline as shown in FIG. 6 while in other embodiments parser 600 can be organized in a non-pipelined structure.

In some embodiments, parser 600 receives a textual input into first handler 602(0). In some embodiments, parser 600 is an "object" in an object-oriented sense as those familiar with object-oriented languages such as C++ or Java will recognize. Additionally, in some embodiments, each handler can also be an object; i.e., the parser object can be comprised of one or more handler objects. In these object-oriented embodiments, handlers within the parser can communicate with each other by a transmitting handler calling a member function of a receiving handler. In other embodiments, data structures such as FIFOs or buffers can be utilized for communicating data and/or commands from a transmitting handler to a receiving handler. In other embodiments, the parser can be an object but the handlers can be implemented as member functions within the parser object. Additionally, in non-object-oriented embodiments, the parser can be implemented as a function or a data structure and handlers can also be implemented as one or more functions.

In some embodiments, parser 600 generates a textual output and a logical output, as discussed above while in other embodiments parser 600 can either generate a textual output or a logical output. Each handler within parser 600 receives a textual input. The output of each handler for a particular condition or textual input received is configured in the handler definition for that handler. During parsing, a handler determines whether the textual input to the handler matches one or more predetermined text strings. A handler can generate textual or logical outputs if the textual input to the handler matches what the handler is configured to receive.

In some embodiments, a single predetermined text string can be used for matching purposes within the handler. In other embodiments, two or more text strings can be used for matching purposes within the handler. In embodiments employing two or more text strings for matching purposes, Boolean operations on comparison results for the two or more text strings are possible. By way of example, in a handler embodiment with three predetermined text strings for matching purposes, e.g., text strings A, B, and C, Boolean operations on comparison results for those predetermined text strings such as AND, OR, XOR, XNOR, and NOT can be performed such as ((A AND B) XOR (NOT (C))). In some embodiments the comparisons to be performed by a handler and the Boolean operations on comparison results to be generated by a handler, if applicable to a particular handler, are defined in the listener portion of the handler definition for that handler.

In each of the embodiments discussed above, inputting a text string into a handler that matches the handler's one or more predetermined text strings can invoke the corresponding handler's one or more parsing functions set forth in the actions portion of the handler's definition. In this way, a handler can be configured to act on specific text strings within the processing pipeline but can also be configured to ignore text strings other than those for which the handler is configured to act. In some embodiments, when a handler is configured to not parse a particular text string it receives as input, the text string is communicated from the handler to a next handler in the processing pipeline. For example if handler 602(1) was configured to not parse string "Hello World", but receives that string as input, handler 602(1) outputs the "Hello World" string to handler 602(2) in this embodiment.

In other embodiments, alternative communication mechanisms can be used to make the pipeline's current string being parsed available to the handlers within the processing pipeline. For example, the parser can be constructed to concurrently communicate the current text string being processed to all handlers and to direct a particular processor to compare the current text string being processed to its one or more predetermined text strings through a logical signal or a function call generated by control logic or code within the parser.

In some embodiments, after a handler receives as input a string that matches the handler's one or more predetermined text strings, the handler performs one or more parsing operations on the string. In some embodiments, the one or more parsing operations to be performed on the matching input string are defined as one or more processing operations within the action portion of the handler's definition. For example, a handler can be configured to modify the string "Hello World" to form the string "Goodbye cruel world".

For embodiments implementing the several parsing operations including a "replace" operation described earlier, several options exist for implementing this string modification. For example, the "replace" operation could be employed to modify the input text to form the output text. In some embodiments, the processing steps defined in the handler's definition are executed sequentially; i.e., the first processing step (e.g., a replace operation) can precede a second processing step (e.g., a split operation) which can precede a third processing step (e.g., an output generation step). In such embodiments, the order of the processing steps executed by a handler are defined by the order of processing steps listed in the handler's definition.

In some embodiments, the order of handler definitions present in the parser's definition determines the order that input strings are passed from one handler to another. For example, a first handler defined in a parser's definition can receive the input to the parser while a second handler defined in the parser's definition can receive as input the output of the first handler. In other embodiments, all handlers could concurrently receive all input strings if the handlers' listener definitions contemplated concurrent reception of all input strings. In some embodiments where all handlers receive all input strings, control logic or software can enable or disable consideration of particular handlers for particular input strings or based on the state of the parser. In still other embodiments, the sequence of handlers within a pipeline can be defined as part of each handler. For example, a first handler definition could define a second handler from which the first handler receives its input. Alternatively, a first handler could define a second handler to which the first handler's output is the input to the second handler.

In some embodiments, as shown in FIG. 6, handlers can generate regenerative outputs. As previously discussed, an example of a parsing operation that generates a regenerative output is a parsing operation that splits a string into two or more substrings that are subsequently parsed. For example, a ten-digit U.S. phone number ("XXX-XXX-XXXX") can be decomposed into an area code, an exchange, and four digits for distinguishing customers within the exchange. In this example, the phone number can be split on the "-" delimiter character. Thereafter, in this example, each substring can reenter the processing pipeline as illustrated in FIG. 6. In other parsing embodiments, strings can be split on other delimiting characters such as spaces, slashes ("/" or "\"), periods ("."), commas, or any arbitrary character or characters that differentiates one portion of a string from another portion of that string.

In some embodiments, regenerative outputs are fed into the start of the processing pipeline; i.e., the first handler. In other embodiments, regenerative outputs could be fed into a particular handler of the processing pipeline. In embodiments in which a regenerative output from a particular handler is fed into a handler other than the first handler in the processing pipeline, the handler definition for the particular handler can include as an argument a target handler definition that directs the parser generator to communicate the regenerative output from the particular handler to the input of the target handler (e.g., handler 602(2)) rather than communicating that regenerative output to a handler at the start of the parsing pipeline (e.g., handler 602(0)).

In some embodiments, the parser definition is used to create the parser. As previously discussed, the parser can comprise executable instructions, or bytecode, or interpreted code. These parser implementations can be created by using a parser generator to receive the defined parser and generate instructions, bytecode, or interpreted code from the defined parser.

In some embodiments, parser generation can begin by reading a template for a parser object from a file. That template can contain the structure of the parser object specific to a predetermined target language such as Java. In other words, the template can have an object definition, an object constructor, and one or more object member functions for the parser object.

In some embodiments, the parser generator can recognize which handlers are defined within the parser definition and can add lines of target language code, such as Java, to instantiate instances of a handler object within the parser object, such as the constructor for the parser object. The parser generator, in certain embodiments, can also recognize the sequence of handlers defined in the parser definition and can sequence inputs and outputs from or to each handler accordingly. For example, the parser generator can recognize that the parser definition contains two handlers and declares that "handler1" precedes "handler2" in a pipeline. In this example, the parser generator can generate code for the parser that communicates the input to the parser as an input to handler1, communicates the output of handler1 as an input to handler2, and communicates the output of handler2 as an output of the parser as a whole.

In some embodiments, the parser generator can also read templates written in the target language for handlers within the parser. For example, a template for a handler can exist that targets a handler written in Java. This template can have an object definition for a handler, a constructor definition for the handler object, and can have member functions that perform I/O operations for the handler object.

In some embodiments, the template for the handler can have member functions for a listener capability as discussed above and member functions for performing one or more actions in response to the listener capability. The member functions for the listener and action capabilities can allow the parser generator to insert code specific to one or more listener strings and one or more actions into the aforementioned listener and action member functions.

After the parser generator has parsed the parser definition and has inserted code for the parser object and handler objects into their respective templates, the parser generator can, in some embodiments, compile the aforementioned templates into executable code. In other embodiments, the aforementioned templates can be converted into bytecode or can be available for interpretation by a programming environment that interprets code statements (e.g., Python or Perl) rather than executes instructions. Other types of templates can also be used in conjunctions with the embodiments described in the present disclosure.

Figure 7:
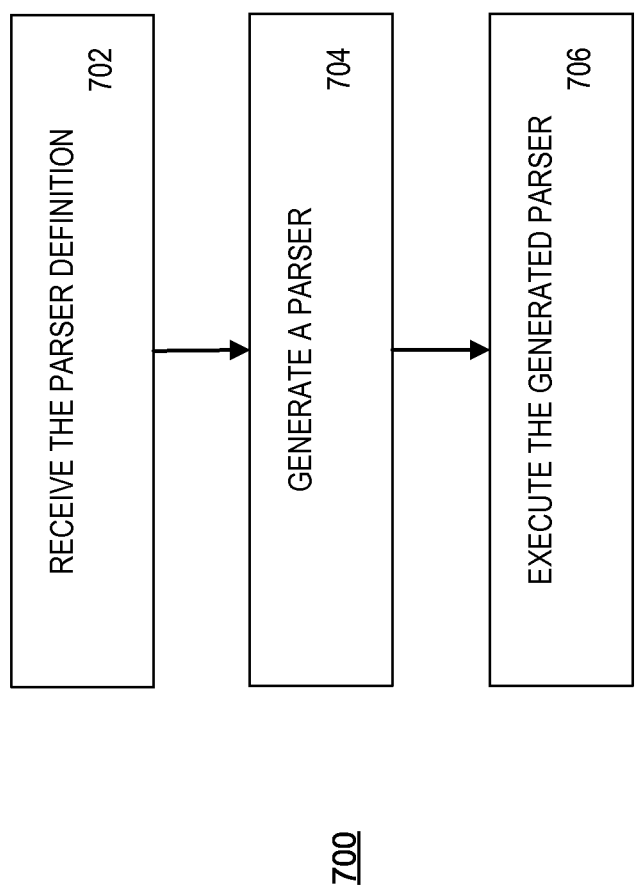
FIG. 7 illustrates the steps of an exemplary process, consistent with some embodiments of the present disclosure.

FIG. 7 illustrates the steps of an exemplary process 700, consistent with some embodiments of the present disclosure. As shown, the exemplary process of FIG. 7 includes the steps of receiving a parser definition (702), generating a parser (704), and executing the generated parser (706), consistent with embodiments described in the present disclosure. Each of these steps were discussed in preceding sections of this discussion and can be carried out accordingly.

In the foregoing specification, embodiments have been described with reference to numerous specific details that can vary from implementation to implementation. Certain adaptations and modifications of the described embodiments can be made. Therefore, the above discussed embodiments are considered to be illustrative and not restrictive.

What is claimed is:

1. A system configured to generate a parser, the system comprising:
  a memory device configured to store a set of instructions; and
  one or more processors configured to execute the set of instructions to perform the following operations:
    receive a parser definition as an input to a parser generator, the parser definition including one or more handler definitions, wherein each handler definition of the one or more handler definitions comprises a handler action definition and at least one handler definition of the one or more handler definitions comprises a handler listener definition; and
    generate the parser using the parser definition, wherein the parser comprises a parsing pipeline comprising two or more handlers, wherein output from a first handler of the two or more handlers is provided to a second handler of the two or more handlers; and
    execute the generated parser.

2. The system of claim 1, wherein:
  a handler action definition comprises definitions for one or more actions; and
  a handler listener definition comprises one or more string comparisons.

3. The system of claim 2, wherein two or more string comparisons are associated through a Boolean expression.

4. The system of claim 1, wherein the one or more processors are configured to execute further instructions to perform the following operation:
  store the generated parser in a parser cache.

5. The system of claim 4, wherein the one or more processors are configured to execute further instructions to perform the following operations:
  receive a request to execute the generated parser;
  retrieve the generated parser from the parser cache; and
  execute the generated parser retrieved from the parser cache, wherein the executed parser acts on data to generate an output.

6. A method for generating a parser, the method being performed by one or more processors and comprising:
  receiving a parser definition as an input to a parser generator, the parser definition including one or more handler definitions, wherein each handler definition of the one or more handler definitions comprises a handler action definition and at least one handler definition of the one or more handler definitions comprises a handler listener definition; and
  generating, using one or more processors, a parser using the parser definition, wherein the parser comprises a parsing pipeline comprising two or more handlers, wherein output from a first handler of the two or more handlers is provided to a second handler of the two or more handlers; and
  executing the generated parser.

7. The method of claim 6, wherein:
  a handler action definition comprises definitions for one or more actions; and
  a handler listener definition comprises one or more string comparisons.

8. The method of claim 7, wherein two or more string comparisons are associated through a Boolean expression.

9. The method of claim 6, further comprising storing, with one or more processors, the generated parser in a parser cache.

10. The method of claim 9, further comprising:
  receiving a request to execute the generated parser;
  retrieving the generated parser from the parser cache; and
  executing the generated parser retrieved from the parser cache, wherein the executed parser acts on data to generate an output.

11. The method of claim 9, wherein the storing further comprises selecting an entry into which the constructed parser will be stored within the parser cache.

12. The method of claim 11, wherein the selected entry is determined at least in part by identifying the cache entry that was least recently used.

13. A non-transitory computer readable medium that stores a set of instructions that are executable by at least one processor of an electronic device to cause the electronic device to perform a method for generating a parser, the method comprising:
  receiving a parser definition as an input to a parser generator, the parser definition including one or more handler definitions, wherein each handler definition of the one or more handler definitions comprises a handler action definition and at least one handler definition of the one or more handler definitions comprises a handler listener definition; and
  generating, using one or more processors, a parser using the parser definition, wherein the parser comprises a parsing pipeline comprising two or more handlers, wherein output from a first handler of the two or more handlers is provided to a second handler of the two or more handlers; and
  executing the generated parser.

14. The non-transitory computer readable medium of claim 13, wherein:
  a handler action definition comprises definitions for one or more actions; and
  a handler listener definition comprises one or more string comparisons.

15. The method of claim 1, wherein at least one of the two or more handlers is a default handler.

* * * * *